US010412880B2

United States Patent
Steffen et al.

(10) Patent No.: US 10,412,880 B2
(45) Date of Patent: Sep. 17, 2019

(54) SEED SENSOR WITH LIGHTPIPE PHOTODETECT ASSEMBLY

(71) Applicant: DICKEY-john Corporation, Shoreview, MN (US)

(72) Inventors: Ronald W. Steffen, Springfield, IL (US); Dahu Qi, Woodbury, MN (US); Gregry C. Miller, Chatham, IL (US)

(73) Assignee: TSI, INCORPORATED, St. Paul, MN (US)

( * ) Notice: Subject to any disclaimer, the term of this patent is extended or adjusted under 35 U.S.C. 154(b) by 0 days.

(21) Appl. No.: 15/918,318

(22) Filed: Mar. 12, 2018

(65) Prior Publication Data

US 2018/0359911 A1 Dec. 20, 2018

Related U.S. Application Data

(63) Continuation of application No. 14/424,131, filed as application No. PCT/US2013/056772 on Aug. 27, 2013, now Pat. No. 9,913,425.

(60) Provisional application No. 61/698,163, filed on Sep. 7, 2012, provisional application No. 61/693,573, filed on Aug. 27, 2012.

(51) Int. Cl.
| | | |
|---|---|---|
| *A01C 7/10* | (2006.01) | |
| *A01C 7/20* | (2006.01) | |
| *G01B 11/14* | (2006.01) | |

(52) U.S. Cl.
CPC .............. *A01C 7/105* (2013.01); *A01C 7/206* (2013.01); *G01B 11/14* (2013.01)

(58) Field of Classification Search
CPC .......... A01C 7/105; A01C 7/206; G01B 11/14
USPC ....................................... 250/222.2
See application file for complete search history.

(56) References Cited

U.S. PATENT DOCUMENTS

| | | | |
|---|---|---|---|
| 3,723,989 A | 3/1973 | Fathauer et al. | |
| 4,163,507 A | 8/1979 | Bell | |
| 4,307,390 A | 12/1981 | Steffen et al. | |
| 4,496,211 A | 1/1985 | Daniel | |
| 4,555,624 A | 11/1985 | Steffen | |
| 4,634,855 A | 1/1987 | Friend et al. | |
| 4,950,997 A | 8/1990 | Austin et al. | |
| 5,307,430 A | 4/1994 | Beach et al. | |
| 5,635,911 A | 6/1997 | Landers et al. | |
| 5,650,609 A | 7/1997 | Mertins et al. | |

(Continued)

FOREIGN PATENT DOCUMENTS

WO 2017/0133034 3/2017

OTHER PUBLICATIONS

Search Report and Written Opinion from corresponding International Application No. PCT/US2013/056772, dated Feb. 6, 2014 (9 pages).

(Continued)

*Primary Examiner* — Seung C Sohn
(74) *Attorney, Agent, or Firm* — Kagan Binder PLLC

(57) ABSTRACT

In one example embodiment, a seed sensor is disclosed adapted to fit a conventional mounting location in existing seed tubes that provides improved performance by providing a wide light source (more LEDS), a wide photodetector and a current profiling scheme for the LEDs that provides more light at the opposite ends of the LED array. A result of such an arrangement is to improve seed resolution and to reduce seed spatial variability within the seed tube.

11 Claims, 10 Drawing Sheets

(56) References Cited

U.S. PATENT DOCUMENTS

| | | | |
|---|---|---|---|
| 5,883,383 | A | 3/1999 | Dragne |
| 6,093,926 | A * | 7/2000 | Mertins .................. A01C 7/105 250/222.1 |
| 8,618,465 | B2 | 12/2013 | Tevs et al. |
| 8,669,514 | B2 * | 3/2014 | Kjartanson ............ A01C 7/105 250/221 |
| 8,845,969 | B2 | 9/2014 | Bangera et al. |
| 2011/0303137 | A1 | 12/2011 | Tevs et al. |
| 2012/0133504 | A1 | 5/2012 | Bangera et al. |
| 2012/0206050 | A1 | 8/2012 | Spero |

OTHER PUBLICATIONS

International Preliminary Report on Patentability from corresponding International Application No. PCT/US2013/056772, dated Mar. 3, 2015 (8 pages).

Extended European Search Report from corresponding European Application No. 13832677.2, dated Jan. 20, 2016 (7 pages).

* cited by examiner

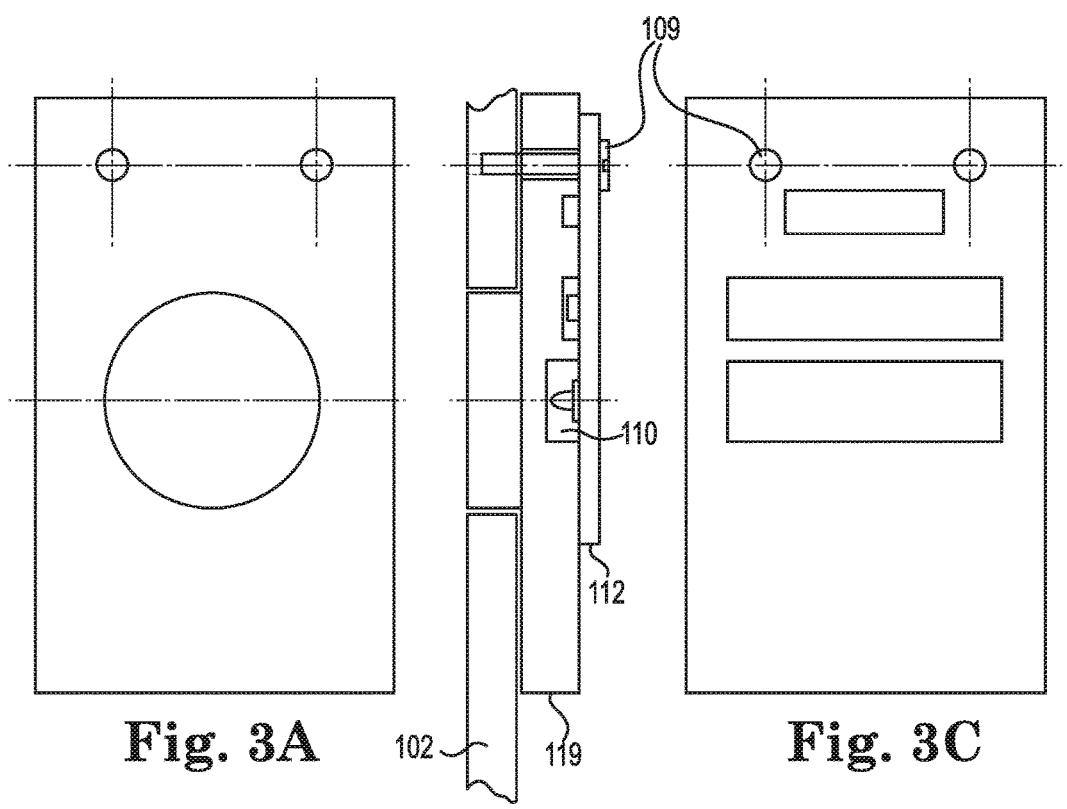

(v⟨0⟩,v⟨1⟩,v⟨3⟩)

(w⟨0⟩,w⟨1⟩,w⟨3⟩)

US 10,412,880 B2

SEED SENSOR WITH LIGHTPIPE PHOTODETECT ASSEMBLY

CLAIM OF PRIORITY

This application is a continuation of application having Ser. No. 14/424,131 and a filing date of May 6, 2015, now U.S. Pat. No. 9,913,425, which claims priority to and the benefit of PCT application PCT/US2013/056772, filed on Mar. 6, 2014, which in turn claims the priority to and the benefit of provisional patent applications No. 61/698,163 filed on Sep. 7, 2012 and No. 61/693,573 filed on Aug. 27, 2012, respectively, all applications of which are hereby incorporated by reference in their entireties.

BACKGROUND

As is known in the art, a field seed planter includes a group of seed chutes or seed discharge tubes, one for each row for simultaneous planting. Each of these seed chutes or tubes convey individual seeds from a seed dispenser in conjunction with a hopper or other seed supply to individual furrows formed in the ground by the planter as it moves across a field. Various monitoring and counting arrangements have been utilized for obtaining a count of the number of seeds dispensed by such seed planters. Such counting is particularly useful in determining and controlling the density or population of seeds planted in order to optimize crop yield. Also, more recently, seed spacing information is of interest since yield is positively affected by the uniform spacing of such seeds.

The prior art has generally utilized photoelectric devices to sense the passage of individual seeds through the seed chutes or tubes. Such arrangements generally have included a light source such as a light emitting diode (LED) positioned to one side of the seed chute or tube and a light responsive element such as a photoresponsive transistor or diode positioned at the opposite side of the tube. Hence, the photoresponsive element normally produces a steady state signal level in response to the light incident thereupon from the light source. However, as a seed passes through the chute and comes between the light source and light responsive element, the level of light incident upon the light responsive element momentarily decreases. Responsively, the light responsive element produces a momentary change in the normal or steady state signal level output, which represents potentially a seed.

Various electrical and electronic circuits have been devised to receive the light responsive element output signal and respond to the changes in the level thereof due to the passage of a seed through the seed chute. Ideally, such electronic circuits should produce a discrete signal or pulse for each seed passing through the chute. Accordingly, accurate information as to the number of seeds dispensed by a given chute may be obtained by counting these pulses.

However, various challenges to accuracy of seed counting are encountered including considerable dirt, dust and the like as the planter moves through the field. Moreover, various coatings are commonly provided on seed grains, and these coatings often accumulate in the seed chutes or tubes. Accordingly, the foregoing accumulations of material in the seed tube tend to interfere with proper operation of the photoresponsive system. Additionally, the characteristics of the photoresponsive element and light source change somewhat over time, thus changing both the ambient light level incident upon the photoresponsive element and its response thereto and to changes in light level due to the passage of seeds. These changes may, if uncompensated for, greatly reduce the reliability of the response of the photoresponsive element. A related problem is that of drift or changes over time in the nominal characteristics of the circuit elements utilized in the electronic circuits. For example, various circuit parameters such as gain, voltage levels, or the like may vary or drift somewhat over time. Such drift may occur for example due to environmental changes, detracting from optimum operation of the circuits and hence from the reliability of the count obtained therefrom.

Yet another challenge occurs as seed deposition rates increase the ability to reliably count multiple seeds which fall through the seed chute in close proximity or even partially overlapping decrease. In such instances, both the photoresponsive element and the associated electronic circuit may be unable to respond rapidly enough to reliably produce a separate counting pulse for each seed. A related problem is often encountered with relatively small, fast moving seeds such as soybeans. Additionally, soybeans are generally dispensed at a relatively high rate or density. Hence, today's seed sensing systems may be incapable of sufficiently rapid response to reliably count each seed and to distinguish between seeds and dust or other foreign matter.

SUMMARY OF INVENTION

In one example embodiment, a seed sensor was developed to fit the conventional mounting location on existing seed tubes but still provide improved performance over the current production sensors by providing a wide light source (more LEDS), a wide photodetector and a current profiling scheme for the LEDs that provides more light at the opposite ends of the LED array. A result of such an arrangement is to improve seed resolution and to reduce seed spatial variability within the seed tube.

In one example embodiment, a seed counting device is provided for counting seeds passing through a longitudinal portion of a seed tube having a front, back and two side walls, the counting device including a sensor assembly adapted to be mounted on a front and back wall of the seed tube, said sensor assembly including an LED (light emitting diode) array disposed opposite a photodetector device adapted to receive light from the LED array, the photodetector device configured to generate signal pulses in response to interruptions in light received from the LED array, the LED array comprised of a plurality of LEDs that are disposed in a line that is substantially perpendicular to the longitudinal portion of the seed tube. The seed counting device further includes a controller means configured to control a current driving each of the plurality of LEDs so as to generate a current profile for a selected LED array, controller means further configured to increase the drive current of at least one LED located adjacent to the tube side wall so as to increase its intensity, thereby improving spatial position detection of seed counting device of a seed passing through the seed tube and allow for adjustments to improve seed deposition accuracy.

In another example embodiment, a particle detection system is provided with improved spatial position detection for substantially distinguishing among particles such as seeds and dust, the particle counting system including a sensor assembly adapted to be mounted on opposite sides of a chute member through which the particles are to pass through, the sensor assembly including an LED (light emitting diode) array disposed on the chute member opposite a photodetector device adapted to receive light from the LED array, the photodetector device configured to generate signal pulses in response to interruptions in light received from the LED array, the LED array comprised of a plurality of LEDs that are disposed in a line that is substantially perpendicular to the longitudinal axis of the chute member. The particle detection system also including a controller means configured to control a current driving each of the plurality of LEDs so as to generate a current profile for a selected LED array, controller means further configured to increase the drive current of at least two LEDs located at each end of the LED array so as to increase its intensity, thereby improving spatial position detection of the particle passing through the chute member and allow for adjustments to improve particle deposition accuracy. In a related embodiment, wherein controller means is configured to individually pulse the LEDs in the array so as to improve particle detection and deposition. In another related embodiment, controller means is configured to communicate with a particle deposition system so as to modify a ground speed of the deposition system as a function of a particle detection data received by controller means.

In yet another example embodiment, a method for detecting seeds in a seed deposition system is provided having an LED array and a photodetector member adapted to receive light from the LED array, the photodetector member generating a signal pulse as a seed interrupts the light received by the photodetector member. The method includes the steps of selecting an LED array with a predetermined number of LEDs as a function of the type of seeds to be detected and the step of generating a current profile for a selected LED array depending on the number of individual LEDs in the array and the type of seeds to be detected. The method also includes the step of driving the current in at least two LEDs at each end of the LED array such an intensity of the at least two LEDs is higher than the LEDs disposed therebetween.

In yet another example embodiment, a seed counting device is provided herein with improved spatial position detection of a seed passing through a seed tube so as to allow for adjustments that will improve seed deposition accuracy and crop yield in seed farming applications. A seed counting system is also provided herein with improved spatial position detection for substantially distinguishing among seeds, multiple seeds, and foreign material such as dust in seed farming applications.

DESCRIPTION OF THE DRAWINGS

FIGS. 3A-3C illustrate front, side and rear views of the LED source array of a sensor assembly according to the invention.

FIG. 14 illustrates a seed tube with a circuit board having a 10 LED array that is disposed behind a clear plastic window and the assembly of which is secured to one side of the seed tube.

DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Figure 1:
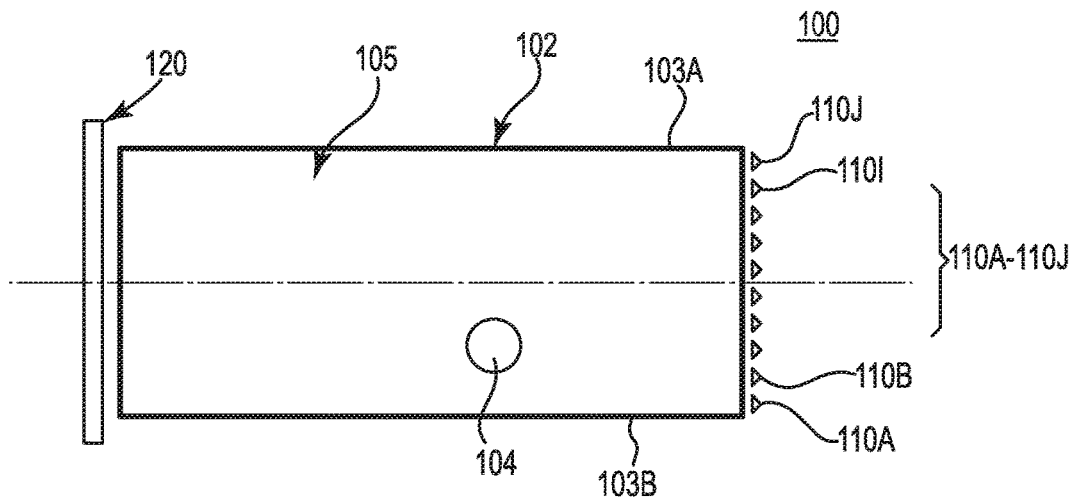
FIGS. 1 and 14 are a top, cutaway view and a perspective view of a seed tube with a seed dropping through the tube with an LED array on one end and a photodetector on the other (there is also a clear window in front of the photodetector). Both the LED source and the photodetector cover the entire width of the tube.
Figure 14:
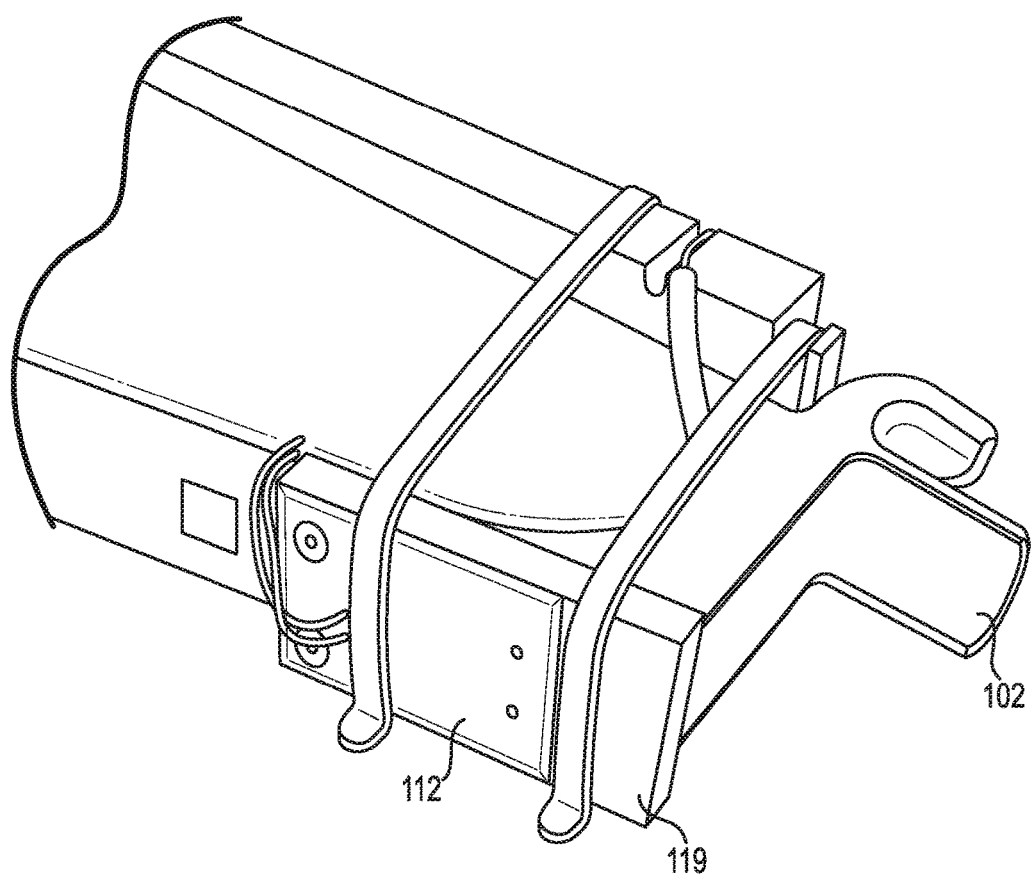

Referring now to FIG. 1, there is shown one example embodiment of a seed sensor assembly 100 in a seed tube 102. Specifically, there is shown a top, cutaway view of seed tube 102 with a seed 104 dropping through the tube with a 10 LED array 110A-110J on one end and a photodetector member 120 on the other (in this example embodiment there is also a clear window in front of the photodetector). This figure shows a top view of seed tube 102 with one seed 104 free-falling. Both the 10 LED array and the photodetector member are spaced back from the tube's (or chute's) inner wall slightly and photodetector 120 extends slightly beyond the chute's inner wall in an orthogonal direction (orthogonal to the direction of the falling seed and the length of the seed tube). In this example embodiment, the photodetector is the 880×110 unit (dimensions in mils) covering the full width of seed tube 102 (700 mils). The 10 LED array also attempt to span the entire width of tube 102 providing light rays over the entire area including near the side walls 103A-103B. This example embodiment of sensor assembly 100 consists of a 10-LED array on 72 mils pitch. FIG. 14 is an example of a circuit board with the 10-LED array that is disposed behind a clear plastic window plate that is secured on one side of the seed tube, opposite a photodetector. In related embodiments, the LED array does not use a window plate or is coated with a special coating to protect the array surface and/or slows down the surface degradation of the array. In related embodiments, the LED array comprises other combinations such as one 3-LED array or a 5-LED array, each of which can be optimized to improve seed counting and identification by varying the current profiling scheme of the LED array used.

Although this example sensor assembly provides various improvements over current sensors (in the example embodiment, at least three), one or more of these improvements are combined and incorporated into various embodiments of sensor assemblies. A first sensor assembly improvement includes a wide light source comprised of 10-LED array 110 (LEDs 110A-110J) of LEDs that are spaced evenly across the narrow dimension of seed tube 102. The ten (10) SMD (surface mount devices) LEDs still provide a pitch dimension that would allow the LEDs to be "Pick-n-Placed" by conventional component placement equipment. The ten LED array in this example configuration also provides a fairly even light source considering the dimensions of the seeds falling through the tube. The individual LEDs at each end of array 110 were very close to side walls 103A and 103B of tube 102, thereby providing light coverage across the whole tube. Another improvement illustrated in FIG. 1 includes the use of a wide photodetector member 120 that is 880 mils wide to cover the entire width of the seed tube versus current photodetectors which are 600 mils wide while the inner seed tube dimension is about 700 mils wide.

Figure 2A:
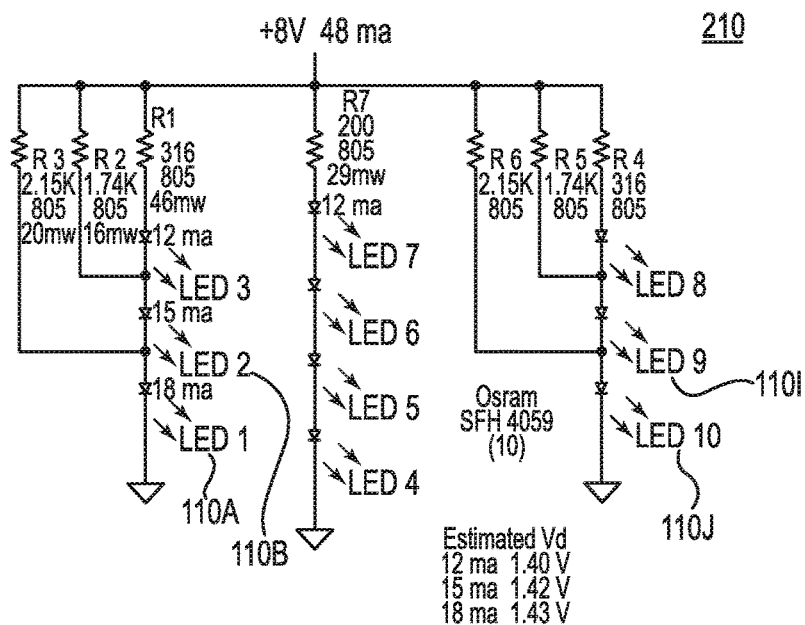
FIGS. 2A-2B illustrate circuit diagrams of a 10 LED array and a wide photodetector of FIG. 1 where the output is used for data acquisition during the testing process.
Figure 2B:
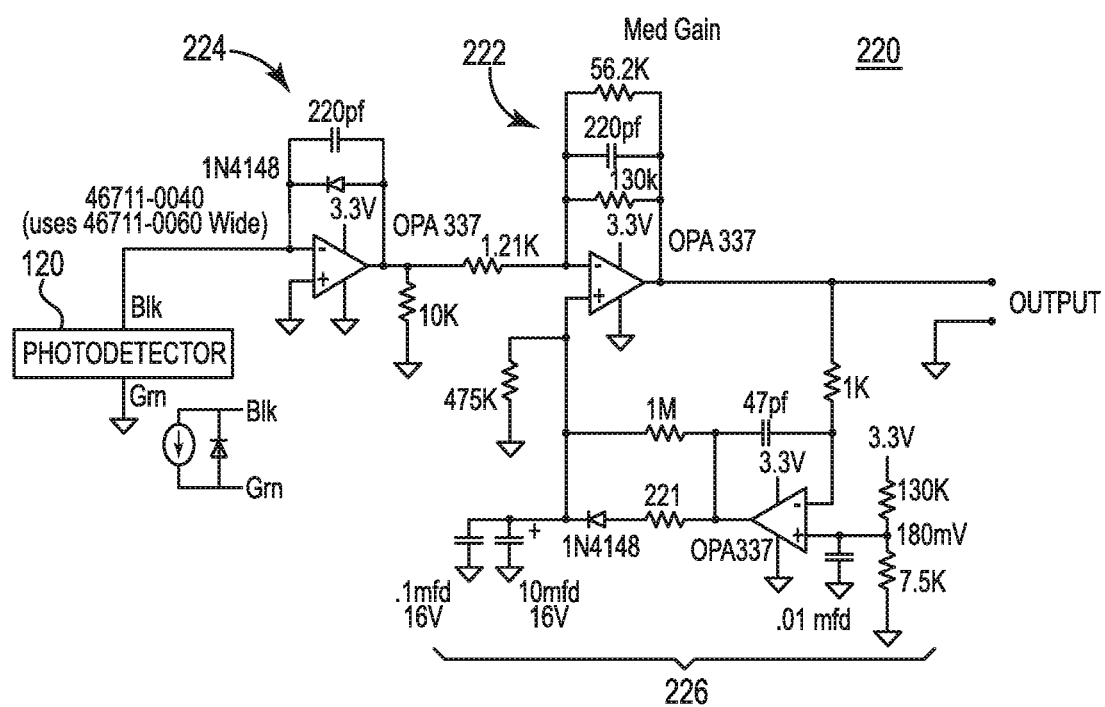

Referring now to FIGS. 2A-2B, in this example embodiment there are shown circuit diagrams 210 and 220 of 10-LED array 110 and of photodetector 120 of FIG. 1, respectively. Circuit 210 illustrates LED array 110 with the LED drive circuitry and circuit 220 illustrates the opposing end circuitry for the photodetector and transmission of data (output 250) to a data acquisition system. In this example embodiment, the current is increased for each of the LEDs at each end of the LED array (e.g., 110A and 110J) to improve upon spatial variability according to the teachings herein. Extra current is provided to the two extreme LEDs as well as the adjacent LEDs (e.g., 110B and 110I in from the extreme LEDs (LEDs 110A and 110J). Pulses received at photodetector 120 are eventually outputted (output 250) to a data acquisition system. Ordinarily, this output would go to an A/D converter of an embedded controller for processing (such as taught in U.S. Pat. No. 5,635,911 to Landers et al, and is incorporated by reference herein in its entirety). This circuit 220 provides "0" voltage bias to photodetector 120 to obtain a speed advantage and a trans-impedance amplifier 224 then converts the short-circuit photodetector current to a voltage. In addition, this amplifier serves as a log amplifier which is used to provide a consistent voltage pulse for a given blockage percentage no matter the ambient optical attenuation. A level shifter 226 is also provided here to keep the signal in a dynamic range. A fixed gain amplifier (222) is shown here for experimental testing. Several gain options would be available under the power of the embedded controller (see also FIG. 7 for more complete description of the seed counting system from a circuit level perspective).

Referring again to FIGS. 1 and 2, another improvement in the sensor assemblies described herein includes the use of Current Profiling for the LEDs located at each end of the LED array (such as 110A, 110B, 110I and 110J) closest to the tube walls (103A and 103B). In this example embodiment (and as described above), the wider LED array 110 and wider photodetector 120 provide coverage that aid in reducing the spatial variability between seeds. Hence a seed falling (e.g., seed 104) anywhere in the seed tube sensing area (space 105 between walls 103A and 103B) will provide much the same signal shape. However, seeds falling near side wall 103A or 103B typically do not have the same blockage of light (which generates the signal pulse that represents the seed count) as seeds falling closer to the center of space 105. In LED array circuit 210, LED 110A corresponds to LED 110A at one end of array 110 and LED 110J corresponds to LED 110J of array 110 at the other end of the array on the seed tube wall. To help compensate or correct for this, in one example embodiment, the LED current in each of the two extreme end LEDs (LEDs 110A and 110J) is increased to a factor of 1.50 times that of nominal. The next two LEDs are increased by a factor of 1.25. This tends to weight seeds near the side wall more heavily in that they block a larger amount of light. Other LED currents may require adjusting yet to obtain optimum variability.

A result of the various improvements described above to reduce spatial variability, is that single seeds falling through the seed tube will give much the same signal pulse in terms of amplitude, area, and duration. This allows an algorithm used to differentiate singles from doubles from triples to function better. This consistency in pulse characteristics allows for a cleaner separation between single seeds and double seeds (two seeds falling through the sensing area at much the same time). This also applies to separation of doubles and triples, and so forth. This consistency also helps differentiate between seeds and foreign material. Dust particles can more easily be segregated from seeds and thus not counted.

In another example embodiment, the accuracy count of the seed sensor is improved by the use of Current Profiling along with the expanded LED array and larger photodetector member when seeds are falling through the sensor at a high rate and are not well singulated. This is particularly a problem with high rate soybeans. This improvement in count accuracy is due to reduced spatial variability of single seed pulses which allows easier separation of seeds falling at about the same time. In yet another related embodiment, seed sensing is improved when implementing the technique of individually pulsing the LEDs in the array. It was determined that a current profile of 1.5/1.25/1.0 would be optimal and operational for the targeted applications, but is not limited to this range.

Referring now to FIGS. 3A-3C, there are shown front, side and rear views of a sensor housing to support an LED array according to the invention. In this example embodiment and with reference to FIG. 14 as well, LED array 110 is disposed on circuit board 112 and covered with a clear window plate 119. This assembly is coupled to seed tube 102 via a fastening member 109. In other related embodiments, other fastening means can be used depending upon tube 102 construction or that of the LED array, the window plate may be eliminated.

Figure 4:
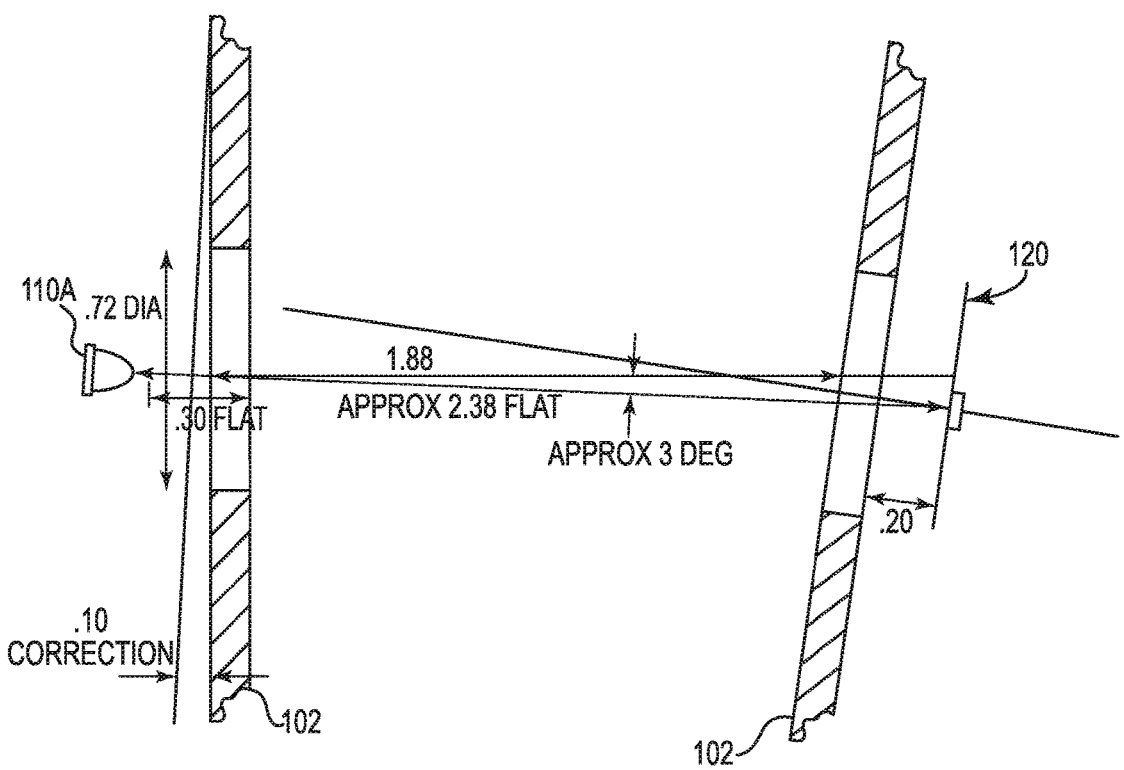
FIG. 4 illustrates an alignment exercise for an LED of the invention and the photodetector in a seed tube in the vertical direction.

Referring now to FIG. 4, there is shown an example of an alignment exercise for an LED and the photodetector in a seed tube in the vertical direction. Since the tube walls of interest are not parallel, it is estimated that a 3 degree correction is needed.

In this example embodiment, 10-LED array 110 was configured to provide the same optical intensity to photodetector member 120 as a 3-LED array. In order to get the 10-LED array to the same level as a 3-LED array, the LED current was set to a nominal (333/178) 6 ma=11.2 ma. Consider the following:
  Center Leg=12 ma
  Right Leg=12+6+3=21 ma Left Leg=12+6+3=21 ma
Total Current=48 ma (3 ma in the right & left legs are common to two LEDs)

Tables 1 and 2, respectively, provide data from a 10-LED array and a 3-LED array variability test and illustrate the voltages from the first stage trans-impedance amplifier when a 0.19 inch diameter vertical rod is used to block the light between the light source (such as the LED array) and the photodetector. The data is gathered from a top view of the seed tube and shows the position of the rod for corresponding voltages for the 10 LED array (Table 1) and also for comparison a previous 3 LED array (Table 2). The position of the voltage labels in the tube correspond to the position of the rod.

TABLE 1

| Increased LED current | Top View | | |
|---|---|---|---|
| 10 LED | No Seed | 05.61 355.8331 | |
| | 0.550 | 0.551 | 0.549 |
| | 0.546 | 0.543 | 0.548 |
| Photodetector | 0.543 | 0.541 | 0.546 | LEDs |
| | 0.545 | 0.543 | 0.545 |
| | 0.550 | 0.549 | 0.545 |

These are top views of the tube with voltages from the 1$^{st}$ trans-impedance amplifier when blocking light with a vertical 0.19 inch diameter rod.

TABLE 2

| 3 LED | No Seed | 0.562 363.584 | |
|---|---|---|---|
| | 0.551 | 0.553 | 0.551 |
| | 0.544 | 0.539 | 0.544 |
| Photodetector | 0.536 | 0.535 | 0.536 | LEDs |
| | 0.543 | 0.541 | 0.543 |
| | 0.546 | 0.551 | 0.546 |

Figure 5:
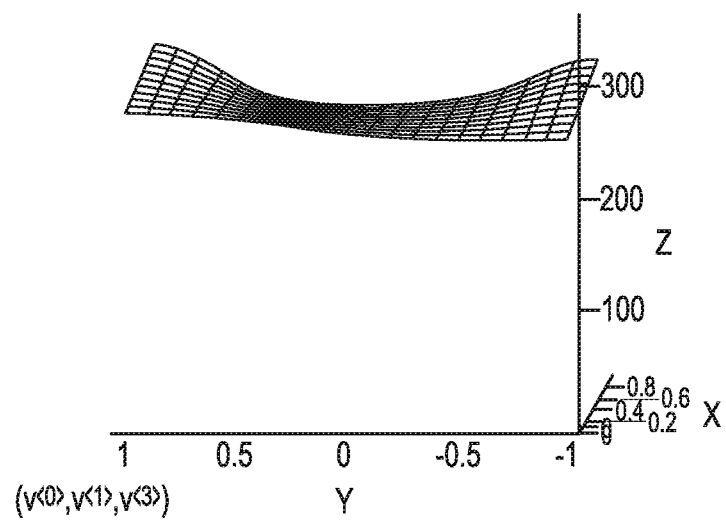
FIG. 5 illustrates a variability graph of a 10 LED sensor assembly reflective of the data provided in Table 1 of the specification.
Figure 6:
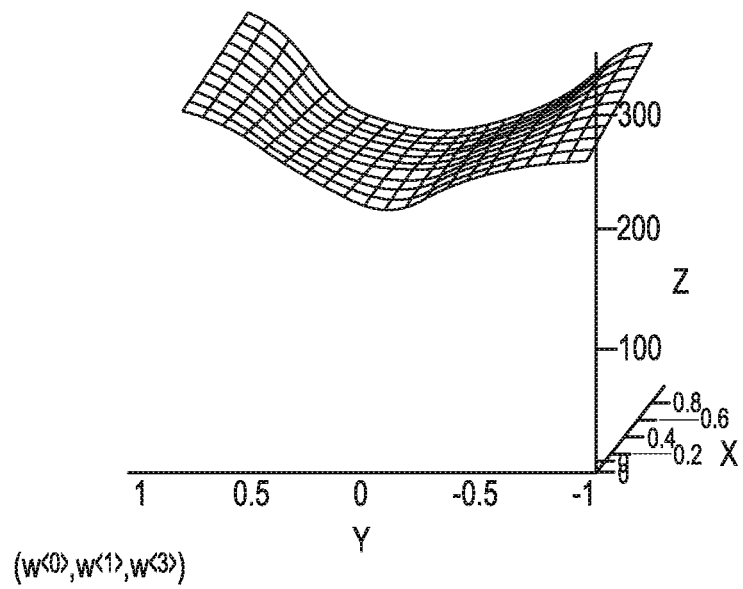
FIG. 6 illustrates a variability graph of a 3 LED sensor assembly reflective of the data provided in Table 2 of the specification.

FIGS. 5 and 6 illustrate LED profile and light intensity variability graphs for the 10 LED and 3 LED sensor assemblies, respectively, as described previously. The LED profile pertains to increasing the current of the LEDs at the far end of the array closest to the side walls to compensate for the reduced light blockage of a seed located near the side wall. For these graphs, the photodetector short circuit current is shown in units of µa. These were reverse calculated from the measured voltages from the 1$^{st}$ trans-impedance amplifier. Note that with greater light coverage in the tube with the 10-LED array and the use of current profiling that the variability is less, hence having a flatter or more even profile then with the 3-LED array.

Figure 7:
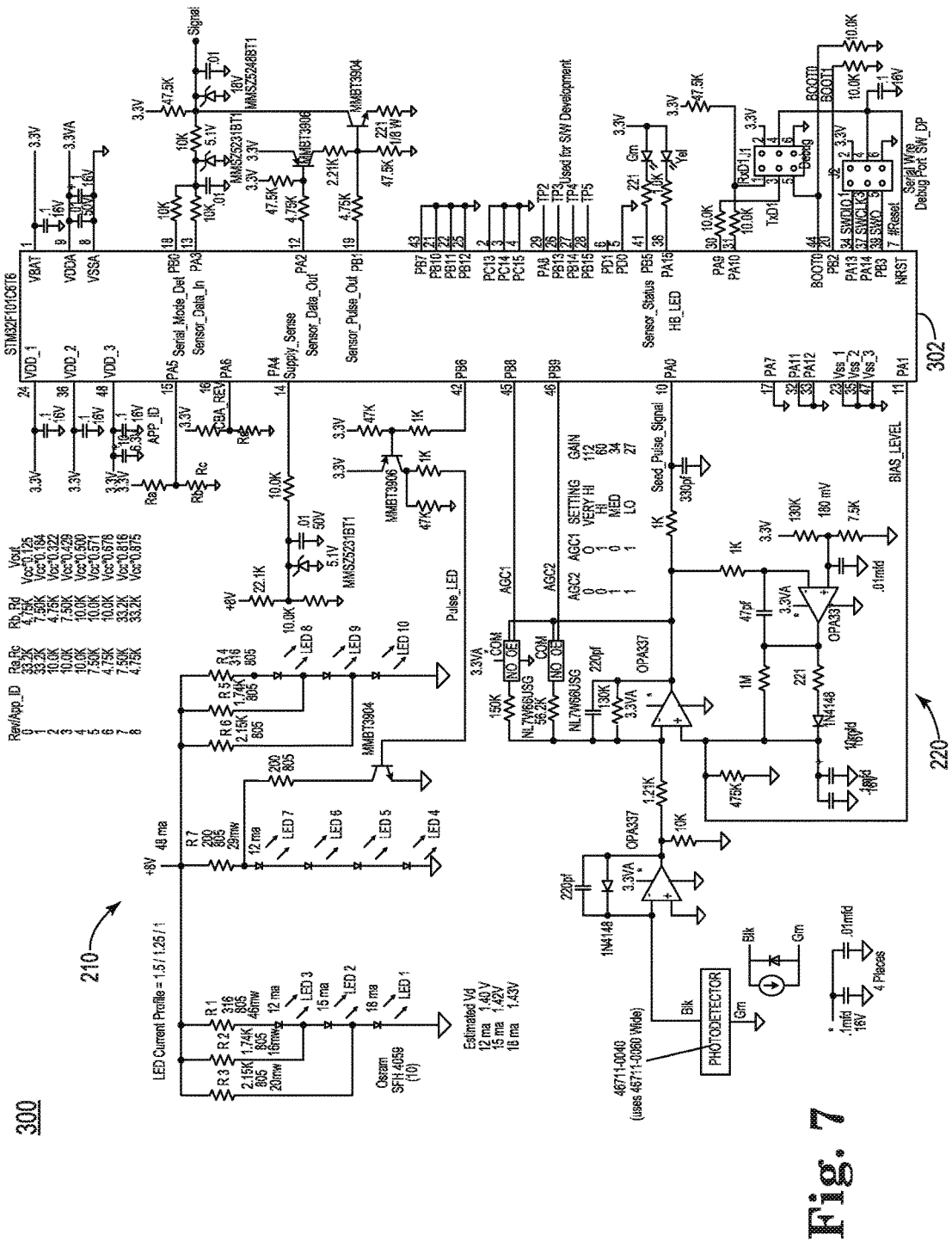
FIG. 7 illustrates a circuit diagram of an embodiment of a sensor assembly according to the teachings of the invention.
Figure 8B:
FIGS. 8A-8C illustrates top, back and side views of a lightpipe or lens element for use in connection with a seed sensor assembly according to the teachings of the invention.
Figure 8C:
Figure 8A:
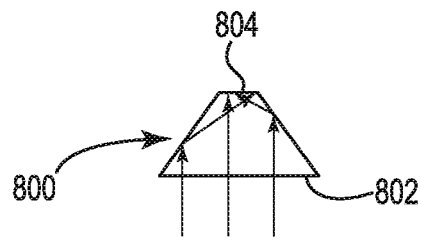

Referring now to FIG. 7, in this example embodiment there is shown a circuit diagram 300 of an embodiment of a seed sensor assembly that uses an STM32F101C6T6 microcontroller 302 according to the teachings of the invention. The front end of circuit 300 includes LED circuit 210 and photodetector circuit 220. The output from the front end or photodetector circuit 220 provides input to the embedded A/D (analog-to-digital) converter of controller 302. The seed counting algorithm functions are based on the digital information from the A/D. Power supply and other support circuits are shown that enable the invention and algorithms. The sensor assembly provides a single-end output that can also be used by the sensor assembly to receive data from a central control unit. An example of such communications would be a request by the control unit for the sensor assembly to perform a self-test. The embedded controller can modulate some of the LEDs such that a self-test can be conducted by the sensor assembly with results transmitted to the control unit.

In a related embodiment, a seed sensor assembly is provided that substitutes a single discrete photodiode for the wide photodetector. This detector resides on a circuit board and a light pipe or light tube or prism channels light from the LEDs to the photodetector diode. In another related embodiment, a Fresnel lens 800A is used in place of the window plate in front of the photodetector (PD) 920 in order to capture more light from the LEDs (see FIGS. 13 and 14).

Referring now to FIGS. 8-14, FIGS. 8A-8C and 12 illustrate various view of a lightpipe or lens element 800 (or optical adapter) for use in connection with a seed sensor assembly according to the teachings of the invention. In this example embodiment, lightpipe member 800 includes a front surface 802 for receiving light that is focused to a back end 804. Instead of directly coupling light into the photodetector, in this example embodiment, optical adaptor element 800, which is made of glass or/and plastic, is inserted before the photodetector.

Figure 9A:
FIGS. 9A-9B illustrate side and top views of a lightpipe or lens element within a seed tube for capturing light projecting therethrough for use in connection with a seed sensor assembly according to the teachings of the invention (top view, multiple arrows; side view, one arrow).
Figure 9B:
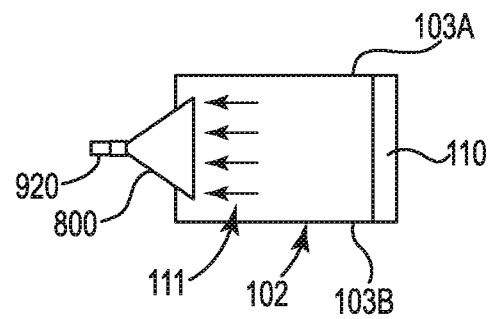
Figure 10A:
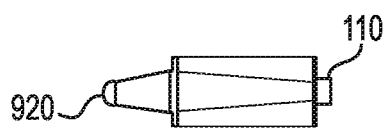
FIGS. 10A-10D illustrate side and top views of a lightpipe with or without a circuit board (view A) and at least two lightpipes with or without a circuit board (view B) for using in connection with a seed sensor assembly according to the teachings of the invention.
Figure 10C:
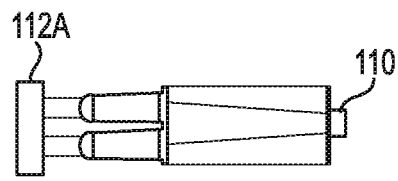
Figure 10B:
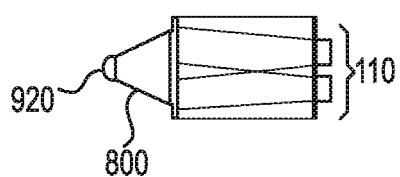
Figure 10D:
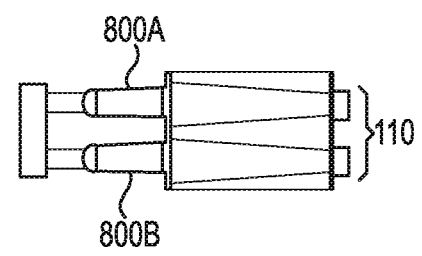

Referring now to FIGS. 9A-9B, there is shown side and top views of a lightpipe or lens element 800 located within seed tube 102 having LED array 110 that generates light 111. Lightpipe 800 captures light 111 projecting therethrough from array 110 for use in connection with a seed sensor assembly according to the teachings of the invention. In particular, there is shown a detector assembly 920 of a small area detector coupled to an optical adaptor (or lightpipe). In this example, the optical adaptor transforms the detection area into a long slit which is desirable in seed sensing/counting applications. The back end 804 (exit) of the optical adaptor is connected to the optical sensor by glue, screw, snap, direct contact or other means. The front end 802 (entrance or light receiving end) of the optical adaptor sits where the optical sensor was, as an effective optical sensor. Light is firstly collected by the front end (wide end) 802 of the optical adaptor, transported by reflection and total-internal-reflection (TIR), and eventually coupled via back end 804 into the optical sensor. This apparatus forms a sight waveguide or light-pipe. In an alternative embodiment, a glass window can be attached to the front end of the adaptor, to protect the adaptor from contamination, mechanical scratches or chemical corrosion. The other part of the seed sensing system will work as usual.

A similar configuration is proposed for the light emitter, in this case, light from an emitter, such as an LED or Laser diode, is coupled into the waveguide at one end and travels through the waveguide to the exit end where the light will emerge to the desired location, such as the seed tube facing the detector aperture. Previous large area optical sensors would normally cover the width of the seed tubing, thereby increasing the price of the overall sensor assembly. The optical adaptor described herein transforms a much cheaper small sensor area (back end of the adaptor) into an effectively large collection area (front end of the adaptor). The small sensor and adaptor combination works exactly as the large area sensor, but costs much less and offers more flexibility in mechanical layout since the adapter may have bends and turns in it. Adapters could be machined parts or molded so as to reduce its cost further. Using the optical adaptor, the sensing area can be effectively and easily reshaped without having to reconfigure other hardware components of the seed sensor. The optical adaptors taught herein apply but is not limited to seed sensors.

Referring now to FIGS. 10A-10D, there are shown side and top views of a lightpipe 800 (and 800A and 800B) with or without a circuit board 112A and at least two lightpipes 800A, 800B with or without a circuit board for using in connection with a seed sensor assembly according to the teachings of the invention. In particular, the views on the left (FIGS. 10A and 10B) illustrate different configurations of optical detectors 800 while the views on the right (FIGS. 10C and 10D) illustrate printed circuit board 112A design flexibility due to optical adaptors 800A and 800B. The two detectors can be very close (A') or some distance apart (B') using the same detector board 112.

Optical adaptors provide for flexible circuit board design, such as when multiple sensors are used, because the size and distance of the sensors are limited by the area of the electrical board. In conventional design, it may be too crowded to put two sensors very close. Using sensor optical adaptors, multiple sensors can be put together to form a sensor array with no physical limit by the individual sensor size and board area, and without using an array detector.

In one example embodiment, a PCB (printed circuit board) board can be shared by multiple optical sensing geometries by changing optical adaptors to different optical setups. This lowers cost on board designs. Optical adaptors also provide for flexible array detector design, such that when an array detector is desired, the number of elements may not always be available. Hence, it effectively couples light into sensor arrays of different shapes with much lower loss than a mask. All of the above applies to the use of the adaptor as a light emitter as well as detector.

Figure 11:
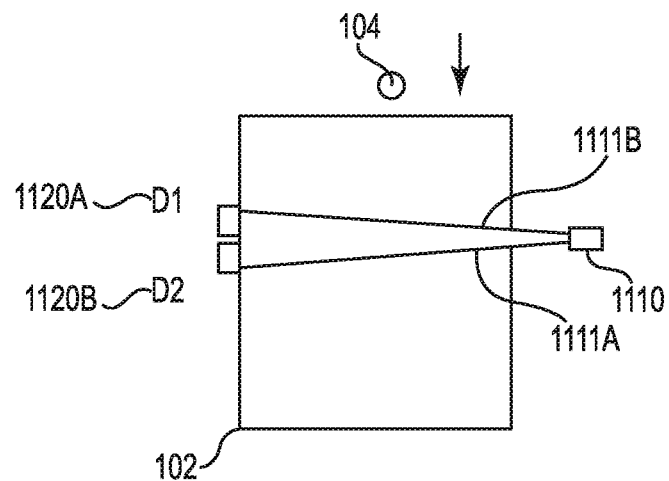
FIG. 11 illustrates an LED projecting two beams of light through a lens element through to two detectors for potential dust detection according to the teachings of the invention.

Referring now to FIG. 11, it illustrates an LED 1110 projecting two beams of light 1111A-1111B through a lens element within a seed tube 102 through to two detectors 1120A-1120B for potential dust detection according to the teachings of the invention. In particular, the two close beams of light provide similar attenuations for dust with each detector being vertical to one another. A seed 104 drops from the top to the bottom (arrow) while dust can come from both directions, which can be detected and rejected as dust counts. The time-of-flight distributions can also be used to reject non-seed events.

Figure 12:
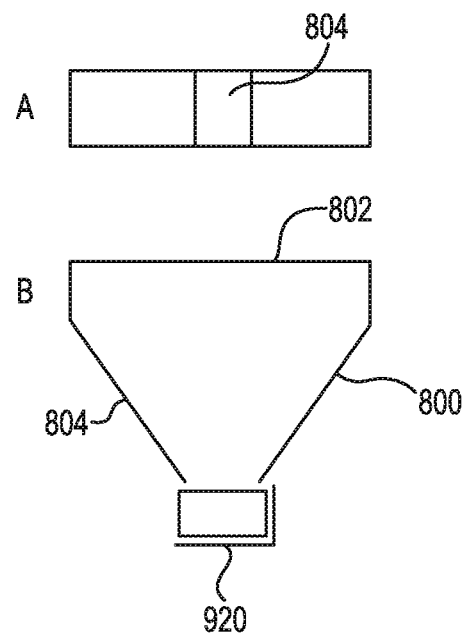
FIG. 12 illustrates a lightpipe assembly or lens at one end and a microphotodetector at another end as an embodiment of an element in a seed sensor assembly according to the teachings of the invention.

The two detectors referred to above can be placed at the front end of an optical detector as shown in FIG. 12, which is a lightpipe assembly or lens at one end and a microphotodetector at another end, in an example embodiment of an element in a seed sensor assembly according to the teachings of the invention. In particular, the light is coupled to the detectors more efficiently, improving sensor operation without increasing cost substantially.

Figure 13:
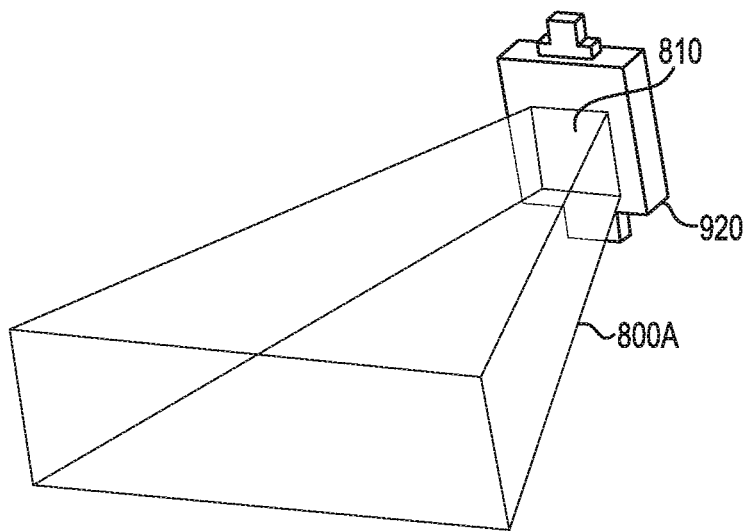
FIG. 13 illustrates a lightpipe assembly with a Fresnel lens at one end and a microphotodetector at another end as an embodiment of an element in a seed sensor assembly according to the teachings of the invention.

Referring now to FIG. 13, it illustrates a lightpipe assembly 800A with a Fresnel lens 810 at one end and a microphotodetector at another end as an embodiment of an element in a seed sensor assembly according to the teachings of the invention. In this example embodiment, the Fresnel lens assists in channeling light even further into the optical adaptor.

The following patents that relate to seed sensor devices are herein incorporated by reference in their entirety and constitute part of the disclosure herein: U.S. Pat. Nos. 4,163,507; 4,307,390; 4,555,624; 4,496,211; 5,307,430 and 5,635, 911.

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways according to the present invention to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

The invention claimed is:

1. A seed counting sensor for use with seeding machines, the sensor comprising:
   a detection chamber or area within a housing or seed tube, the detection chamber or area allowing the seeds to pass through the sensor having a center longitudinal axis extending in the flow direction of the seeds;
   a plurality of light sources arranged within the housing or seed tube at predetermined distances from each other, the light sources being in a plane extending substantially perpendicularly to the center axis of the sensor;
   a plurality of light detectors arranged within the housing or seed tube at predetermined distances from each other, the light detectors being in substantially the same plane as the light sources, wherein the number of the light detectors equals the number of the light sources; and
   a signal processing unit or controller for controlling operation of the light sources and for processing electronic signals produced by the light detectors in response to interruptions of light received from the light sources;
   wherein the sensor further comprises optical adapters arranged in front of the light sources and the light detectors, respectively, the optical adapters configured to form a sight waveguide to channel light from the light sources to the light detectors;
   wherein the light sources are separated from each other, and
   wherein the light sources and the light detectors are arranged in the plane so that they are capable of scanning substantially the entire cross section of the detection chamber or area.

2. The seed counting sensor according to claim 1, wherein the light sources are LEDs and the light detectors are phototransistors.

3. The seed counting sensor according to claim 1, further comprising a control circuit for regulating the light intensity of the light sources as a function of the light intensity detected by the light detectors.

4. The seed counting sensor according to claim 3, wherein the controller and the control circuit change a drive current of the light sources caused by dust in the seed tube.

5. The seed counting sensor according to claim 1, wherein the optical adapter are made of plastic.

6. The seed counting device of claim 1 further comprising a window or a light transmissive plate protecting the light sources.

7. A method of improving seed detection within a seed tube caused by deteriorating optical properties of one or more seed sensors, the method comprising the steps of:
   providing a sensor assembly adapted to be mounted on the seed tube, the sensor assembly including a plurality of light sources disposed opposite a plurality of photodetectors adapted to receive light from the light sources, the photodetectors configured to generate output current signals in response to interruptions in light received from the light sources, the light sources being disposed in a line that is substantially perpendicular to a longitudinal axis of the seed tube;

processing the output current signals received from the light detectors; and controlling a current driving each of the plurality of light sources and changing the drive current of the light sources to increase the intensity of light in the seed tube received by the light detectors.

8. The method of claim 7, wherein the light sources are LEDs and the light detectors are phototransistors.

9. The method of claim 7, wherein the light sources include a window protecting the light sources and deterioration of the optical properties of the seed sensors is caused by at least one of pelleting agents deposited on the windows and dust.

10. The method of claim 7, further comprising the step of providing an optical adapter to at least one of the light detectors to collect light from the corresponding light source.

11. The seed counting device of claim 1 wherein the controller is configured to substantially distinguish among multiple seeds.

* * * * *